US007668382B2

(12) United States Patent
Wu et al.

(10) Patent No.: US 7,668,382 B2
(45) Date of Patent: Feb. 23, 2010

(54) BLOCK-BASED FAST IMAGE COMPRESSION

(75) Inventors: Feng Wu, Beijing (CN); Bo Qin, Beijing (CN); Wenpeng Ding, Hefei (CN); Dong Liu, Hefei (CN); Jian Wang, Beijing (CN); Yuwen He, Beijing (CN); Zheng Ni, Beijing (CN)

(73) Assignee: Microsoft Corporation, Redmond, WA (US)

( * ) Notice: Subject to any disclaimer, the term of this patent is extended or adjusted under 35 U.S.C. 154(b) by 864 days.

(21) Appl. No.: 11/276,342

(22) Filed: Feb. 24, 2006

(65) Prior Publication Data
US 2007/0201751 A1 Aug. 30, 2007

(51) Int. Cl.
*G06K 9/36* (2006.01)
(52) U.S. Cl. .................... 382/232; 382/162; 382/168; 382/173; 382/233; 382/251
(58) Field of Classification Search ............. 382/162, 382/168, 173, 175, 176, 232, 233, 250, 251
See application file for complete search history.

(56) References Cited

U.S. PATENT DOCUMENTS 5,414,527 A * 5/1995 Koshi et al. ............. 382/239
5,973,681 A 10/1999 Tanigawa et al.
6,426,809 B1 * 7/2002 Hayashi et al. ............ 358/529
6,449,658 B1 * 9/2002 Lafe et al. ................ 709/247
2004/0042547 A1 * 3/2004 Coleman ............... 375/240.01
2005/0135693 A1 * 6/2005 Ahmed et al. ............ 382/251
2005/0149865 A1 * 7/2005 Wang et al. .............. 715/530
2005/0191032 A1 9/2005 Seo et al.

FOREIGN PATENT DOCUMENTS

KR 20060127344 (A) 12/2006

\* cited by examiner

*Primary Examiner*—Samir A. Ahmed
*Assistant Examiner*—Ali Bayat
(74) *Attorney, Agent, or Firm*—Lee & Hayes, PLLC (57) ABSTRACT

Systems and methods for block-based fast image compression are described. In one aspect, a digital image is segmented into multiple blocks. A respective set of statistical characteristics is identified for each of the segmented blocks. Each of the blocks is encoded with a particular encoding algorithm of multiple encoding algorithms. The particular encoding algorithm that is used to encode a particular block segmented from the digital image is selected to efficiently encode the block in view of statistical characteristics associated with the block. Thus, blocks of different block types may be encoded with different encoding algorithms.

20 Claims, 6 Drawing Sheets

BLOCK-BASED FAST IMAGE COMPRESSION

BACKGROUND

A digital compound image includes mixed raster content (MRC) such as some combination of text and picture image (s) and/or graphic(s). Exemplary compound images include, for example, screen captures, electronic newspapers and magazines, web pages, etc. With the widespread use of digital devices such as personal computers, digital cameras, imaging-enabled cell phones, etc., availability and sharing of compound images is becoming more common. To store and communicate digital compound images, a compound image is typically compressed (encoded) to reduce size. The quality requirement of compound image encoding is generally different from the quality requirement for encoding images that do not contain text (a general/non-compound image). This is because sensitivity of the human eyes for natural images (e.g., captured images, etc.), texture, text and other sharp edges, is often different. While there may be several acceptable levels of pure image and texture quality, a user will typically not accept text quality that is not clear enough to read. This is because text typically contains high-level semantic information.

The Lempel-Ziv encoding algorithm is designed to compress pure text images (e.g., images with only text on the pure color background). JPEG image encoding is suitable for images that include only pictures and no text. One reason for this is because JPEG encoding algorithms typically do not perform very well when encoding text. Additionally, existing compound image encoding techniques such as layered coding techniques do not typically perform well when encoding pure text images. Layered encoding techniques are also very processing intensive, making them generally unsuitable for real-time applications that demand constant bit-rate encoding and rate allocation (e.g., for streaming compound image content). Moreover, conventional block-based compound image encoding typically compress text blocks using JPEG-LS and picture blocks using JPEG. Such block-based encoding techniques fail to perform well when encoding compound images that include some combination of text and picture image(s).

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, systems and methods for block-based fast image compression are described. In one aspect, a digital image is segmented into multiple blocks. A respective set of statistical characteristics is identified for each of the segmented blocks. Each of the blocks is encoded with a particular encoding algorithm of multiple encoding algorithms. The particular encoding algorithm that is used to encode a particular block segmented from the digital image is selected to efficiently encode the block in view of statistical characteristics associated with the block. Thus, blocks of different block types may be encoded with different encoding algorithms.

BRIEF DESCRIPTION OF THE DRAWINGS

In the Figures, the left-most digit of a component reference number identifies the particular Figure in which the component first appears.

DETAILED DESCRIPTION

Overview

Systems and methods for block-based fast image compression are described. The systems and methods divide a digital image (a compound or non-compound image) into blocks. Each of the blocks is then evaluated in view of statistical and other characteristics of the block to classify the block as a particular block type. In this implementation, block types include, for example, smooth, text, hybrid, and picture block types, although other block types could be used. The systems and methods select a respective encoding algorithm of multiple encoding algorithms to encode each block to maximize compression performance in view of the block's block classification type and quality and rate constraints.

These and other aspects of systems and methods for block-based fast image compression are now described in greater detail.

An Exemplary System

Although not required, the systems and methods for block-based fast image compression are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
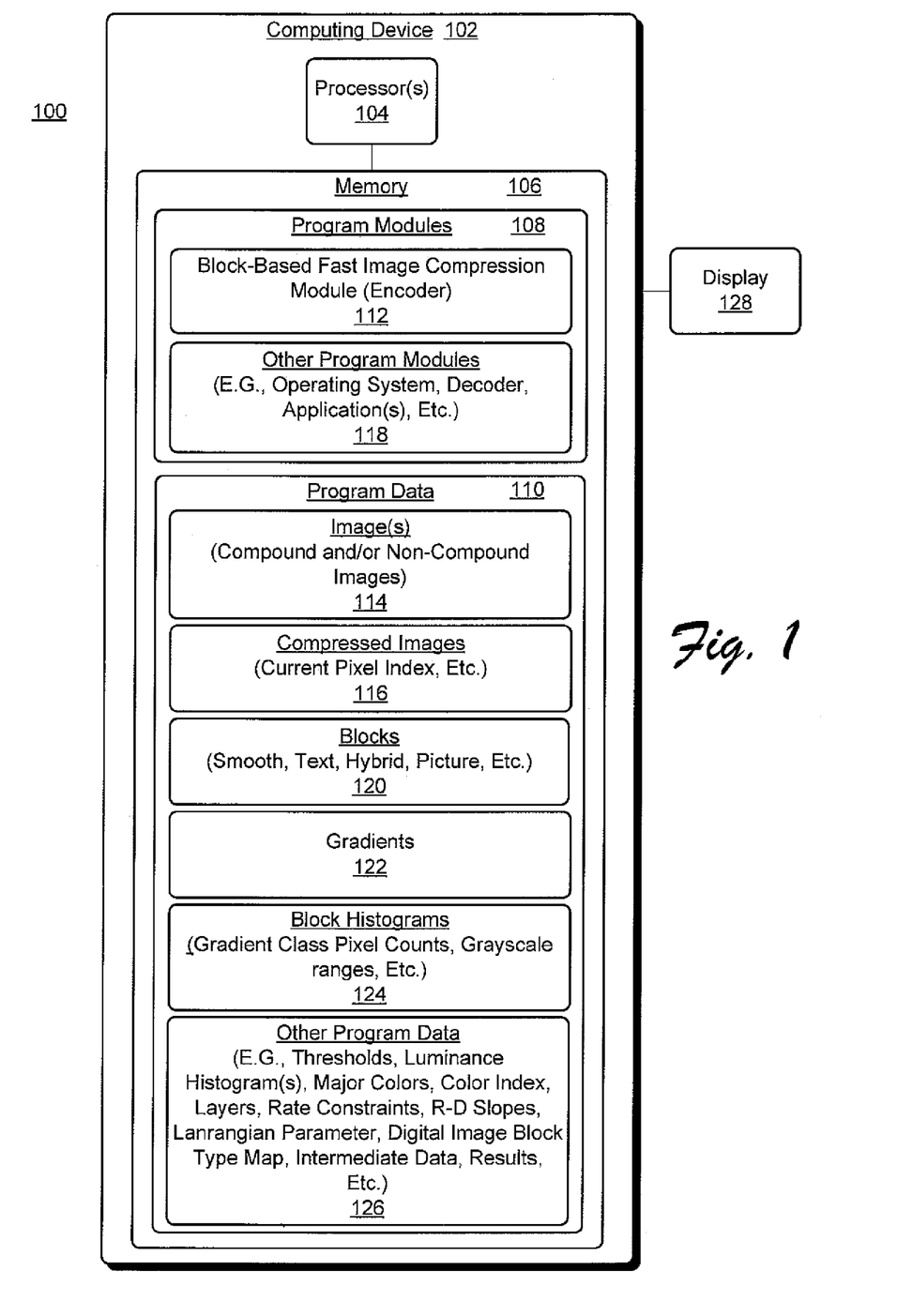
FIG. 1 shows an exemplary system for block-based fast image compression, according to one embodiment.

FIG. 1 shows an exemplary system 100 for block-based fast image compression, according to one embodiment. System 100 includes computing device 102. Computing device 102 represents any type of computing device such as a personal computer, a server, a laptop, a handheld or mobile computing device, a small form factor device, a digital camera, etc. Computing device 102 includes one or more processing units 104 coupled to memory 106. Memory 106 includes system memory and any other type of memory coupled to computing device 102. System memory (e.g., RAM and ROM) includes computer-program modules ("program modules") 108 and program data 110. Processor(s) 104 fetch and execute computer-program instructions from respective ones of the program modules 108. Program modules 108 include block-based fast image compression module 112 ("encoder 112") for encoding image content 114 (compound and/or non-compound images) to generate compressed images 116. Program modules 108 also include "other program modules" 118 such as an operating system, a decoder to decode a compressed image 116, application(s) that leverage aspects of block-based fast image compression module 112, and/or so on. The decoder decodes a compressed image using a reverse set of operations used to generate the compressed image 116, as discussed below. Although encoder 112 is shown on the same device 102 as a decoder 118, these program modules do not need to exist on the same computing device and may be part of different computing devices. In this scenario, an image 114 can be encoded on a first device 102 and decoded on a different device 102.

Encoder 112 segments (divides) an image 114 into blocks 120. In one implementation, each block 120 is 16×16 pixels. Size of the segmented blocks is arbitrary and can vary across blocks or represent a same segment size. BFIC model 112 then classifies each block 120 as one of multiple different block types based at least on the block's respective statistical characteristics. In this implementation, the different block types include smooth, text, hybrid, and picture block types. The statistical characteristics include, for example, directional gradient distributions associated with each pixel in a block 120. For each block 120, encoder 112 selects a particular compression algorithm to encode the block 120 in view of the block's type classification, rate constraint(s), and quality parameters. Encoder 112 used the selected encoding algorithm to encode the block 120. This is performed for each segmented block to generate a corresponding compressed image 116.

Specifics of how encoder 112 classifies blocks 120 into one of multiple possible blocks types are now described.

Exemplary Block Classification

Encoder 112 calculates gradients 122 and generates gradient histogram(s) 124 for each block 120 to identify statistical characteristics for each block. A gradient is an absolute difference between a pixel and a neighboring pixel. With the exception of boundary pixels, each pixel in a block 120 has 8 neighboring pixels. To generate gradients 122 for a block 120, encoder 112 calculates 8 directional gradients for each non-boundary pixel in the block 120. In this implementation, and when neighboring pixels are not in the same block, gradients of boundary pixels are not calculated. In another limitation, gradients of boundary pixels are calculated in view of (by borrowing) pixels in other blocks. To determine distributions of gradient values, encoder 112 thresholds (independent of gradient direction) the gradients 122 for a block 120 to classify and group gradients 122. For example, encoder 112 groups gradients 122 that are less than threshold $G_1$ (e.g. $G_1=6$) into a low-gradient class, greater than a threshold $G_2$ (e.g. $G_2=36$) into a high-gradient class, and in between $G_1$ and $G_2$ into a mid-gradient class. Encoder 112 creates a respective gradient histogram 124 for each block 120 based on that block's gradient distributions and pixel color (e.g., 0-255).

Figure 2:
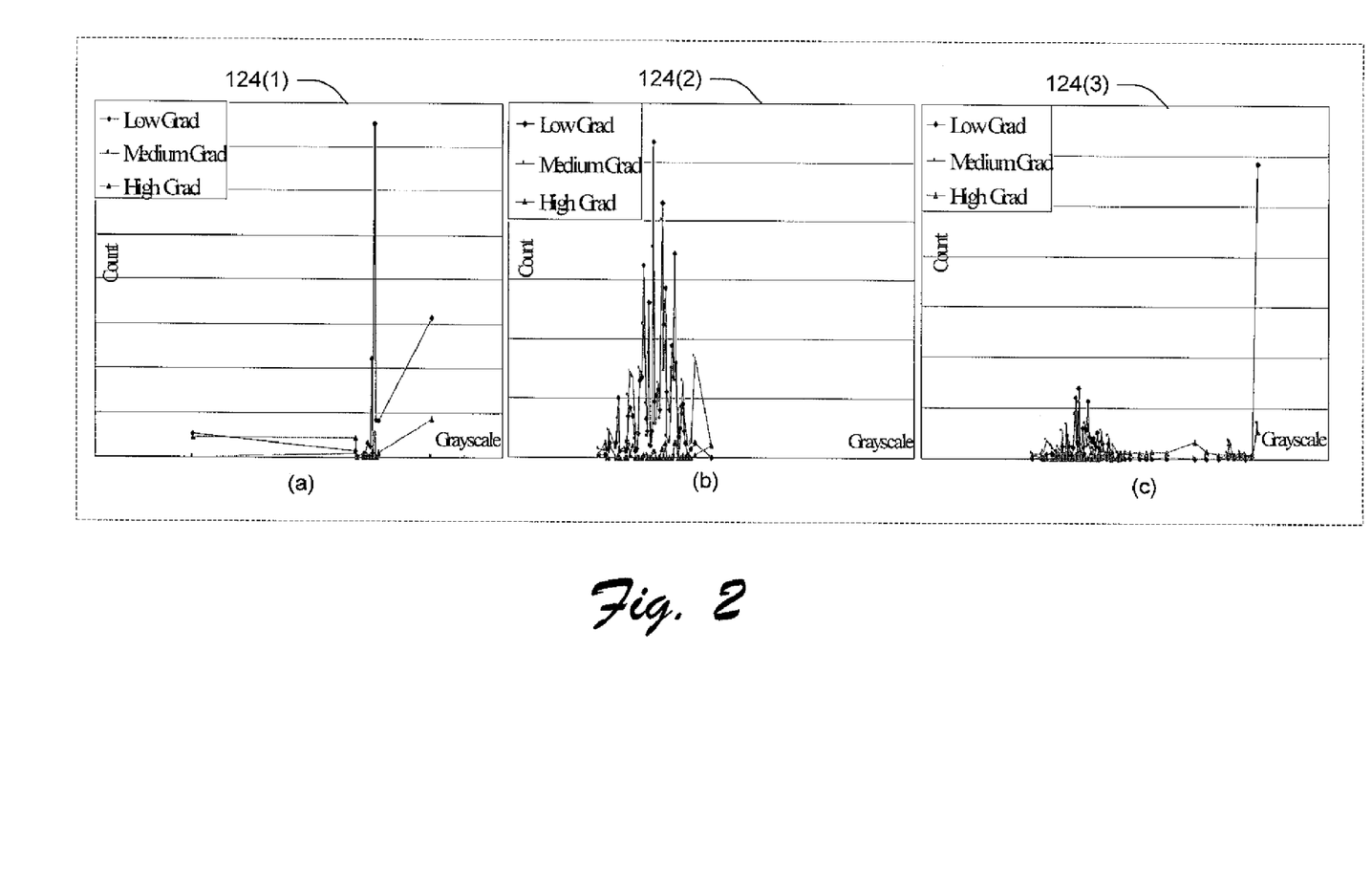
FIG. 2 shows an exemplary set of block gradient histograms associated with blocks segmented from a digital image, according to one embodiment.

FIG. 2 shows an exemplary set of gradient histograms 124, according to one embodiment. In these examples, horizontal coordinates represent pixel gray values (e.g., 0-255), and vertical coordinates represent pixels counts. For example, when gradient of a pixel is low, then the count of low gradient at the pixel gray value increases one. In FIG. 2, blocks 120 of different type exhibit different gradient-histogram distributions. For instance, FIG. 1(a) represents a histogram 124 of a block 120 that has been classified as a text block type; FIG. 1(b) represents a histogram 124 of a block 120 that has been classified as a picture block type; and FIG. 1(c) represents a histogram 124 of a block 120 that has been classified as a hybrid block type. Based on the gradient distributions exhibited by each block 120, encoder 112 classifies the block 120 as a smooth, text, hybrid, or picture block type. A histogram 124 representing a smooth block type will typically exhibit only low gradient pixels and show one peak corresponding to a low-gradient class pixel distribution. A histogram 124 representing a text block type will typically exhibit several peaks with respect to low-gradient high-gradient pixel class distributions. A histogram 124 for a picture block type will typically exhibit only a few mid-gradient class pixels. If a block 120 contains large numbers of high-gradient classified pixels and mid-gradient classified pixels, encoder 112 classifies the block 120 as a hybrid block type.

Figure 3:
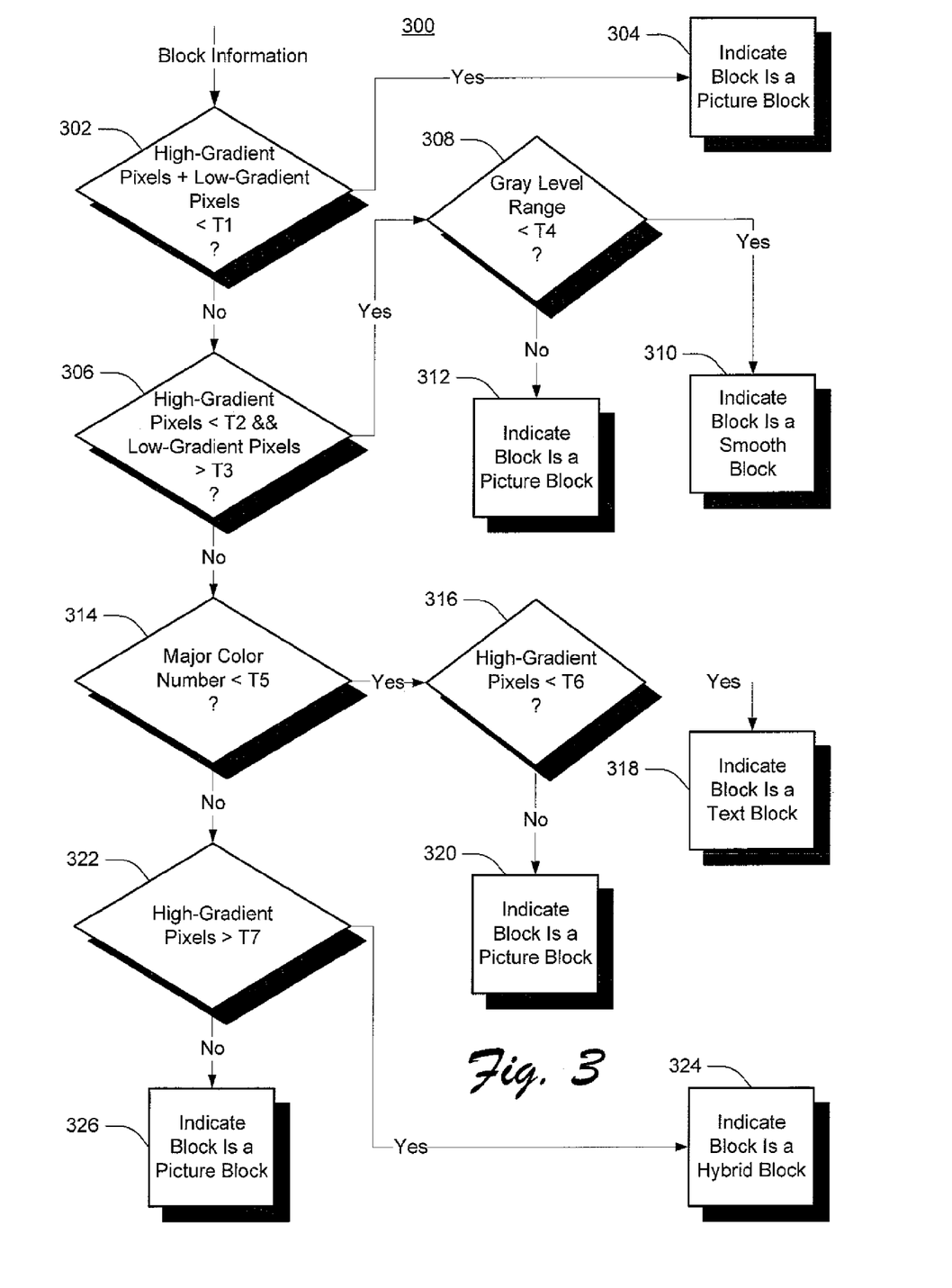
FIG. 3 shows an exemplary procedure for classifying block type of blocks segmented from a digital image, according to one embodiment.

FIG. 3 shows an exemplary procedure 300 for classifying block type of blocks segmented from a digital image, according to one embodiment. In this implementation, block types include, for example, picture, smooth, text, and hybrid block types, although other block classifications could be used. For purposes of exemplary description and illustration, the operations of the procedure are described with respect to the components of FIG. 1. At block 302, and in view of block information associated with a block 120, encoder 112 (FIG. 1) determines whether the count of high and low gradient classified pixels is less than a first threshold $T_1$. (The block information includes information associated with the block 120 such as a corresponding histogram 124, color information, etc.) If so, at block 304, encoder 112 classifies the particular block 120 as a picture block. Otherwise, at block 306, encoder 112 determines whether a number of high-gradient pixels is less than a second threshold $T_2$, and whether the number of low-gradient pixels is greater than a third threshold $T_3$. If so, at block 308, encoder 112 determines whether the gray level range of the block 120 is less than a fourth threshold $T_4$. If the results of block 308 are positive, at block 310, encoder 112 indicates that the block 120 is a smooth block. If the results of block 308 are negative, at block 312, encoder 112 indicates that the block 120 is a picture block.

If the results of block 306 were negative, at block 314, encoder 112 determines if the major color number associated with the block 120 is less than a fifth threshold $T_5$. As discussed below in the section titled "Exemplary Text Block Coding" a block 120 may include colors, of which one or more may be classified as more dominant (major) than the other colors. Encoder 112 assigns numerals to these major colors. If the results of block 314 are positive, encoder 112 at block 316 determines whether the number of high-gradient pixels associated with the block 120 are less than a sixth threshold $T_6$. If so, at block 318, encoder 112 indicates that the block 120 is a text block. Otherwise, at block 320, encoder 112 indicates that the block 120 is a picture block.

If the results of block 314 were negative (i.e., the major color number is less than the fifth threshold), at block 322, encoder 112 determines whether the number of high-gradient classified pixels in the block 120 is greater than a seventh threshold $T_7$. If so, at block 324, encoder 112 classifies the block 120 as a hybrid block. Otherwise, at block 326, encoder 112 indicates that the block 120 is a picture block.

In the above examples of the FIG. 3, thresholds $T_1$ through $T_7$ are configurable.

Exemplary Digital Image Block Coding

Blocks 120 of different type are distinct in nature and have different statistics distributions, as illustrated above with respect to histograms 124. A smooth block 120 (a block 120 classified as a smooth block) is typically very flat and dominated by one kind of color. A text block 120 is more compact in spatial domain than that in Discrete Cosine Transfer (DCT) domain. The energy of a picture block 120 is mainly concentrated on low frequency coefficients when they are DCT transformed. A hybrid block 120 containing mixed text and picture images cannot be compactly represented both in spatial and frequency domain. Because of the different characteristics of different block types, encoder 112 implements a different respective encoding algorithm to compress blocks 120 of different block type. In this implementation, encoder 112 implements four different encoding algorithms to effectively compress the different block types.

Exemplary Smooth Block Coding

Smooth blocks 120 are dominated by one color and their gray level range is limited to the given threshold. In view of this, encoder 112 quantizes all colors in smooth blocks 120 to the most frequent color, which in this implementation, is coded using an arithmetic coder portion of encoder 112.

Exemplary Text Block Coding

Text blocks 120 are typically dominated by several major colors. In view of this, encoder 112 selects colors with frequency above a given threshold as major colors (i.e., colors dominating the block 120). If there are more than four colors satisfying this requirement, encoder 112 selects only the first four colors with largest number in a corresponding luminance histogram as major colors. Encoder 112 quantizes the colors close to major colors within a given distance threshold to corresponding major colors. TABLE 1 shows an exemplary algorithm to quantize certain colors to major colors.

TABLE 1

EXEMPLARY COLOR QUANTIZATION

Find first four major colors { $M_0, M_1, M_2, M_3$ };
FOR each pixel $P_i$
    FOR each major color j
        IF $|P_i - M_j| < $ Th for some j, THEN
            $P_i := M_j$;
        ENDIF;
    ENDFOR;
ENDFOR;

As shown in TABLE 1, encoder 112 first converts every pixel's color in the text block 120 to a color index. In this implementation, the major colors in the block 120 are indexed by 0, 1, 2, and 3 respectively. All the other colors are converted by BFIC model 112 to index 4. The major colors in each block are recorded.

Figure 4:
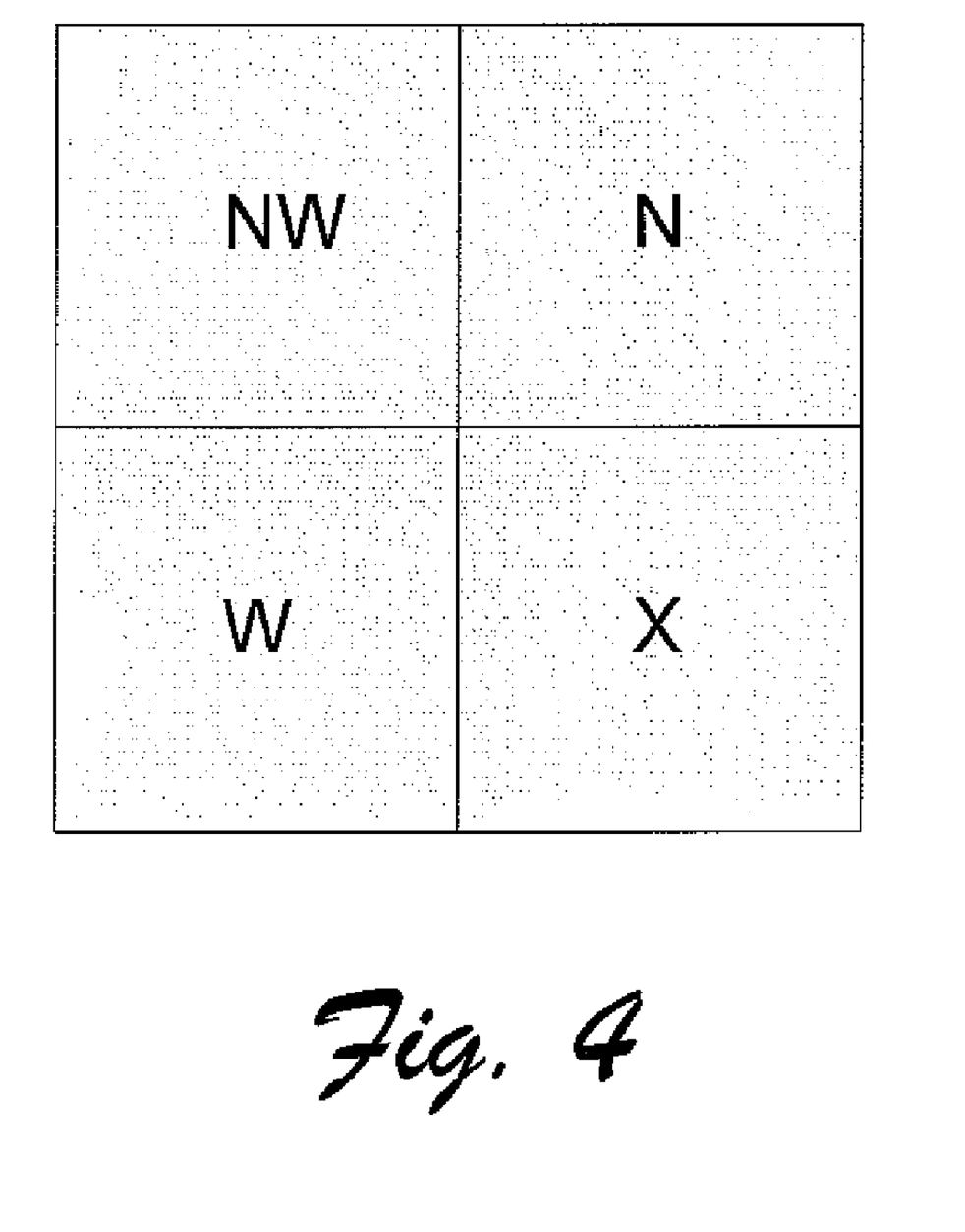
FIG. 4 shows exemplary text block coding contexts, according to one embodiment.

Encoder 112 scans and compresses the color index for the text block 112 in a raster scanning order and the current pixel index is coded based on its causal neighbors (as shown in FIG. 4) to exploit the spatial relevance in order to improve coding efficiency.

FIG. 4 shows exemplary text block coding contexts, according to one embodiment. Referring to FIG. 4, context is generally described as P(NW, N, W), where NW, N, W are the coded neighboring index, and the function P is the possibility of certain value of the current index. P is a kind of prediction to the current index from neighboring indexes. In this example, "X" is current pixel to be coded. Each neighbor pixel may represent one of five possible different index values. As a result, there are total $5^3$=125 contexts for coding the current pixel "X". Encoder 112 codes the current pixel index using an arithmetic coder using the context specified by its three causal neighbors [NW, N, W]. If the current pixel index is 4, the pixel value is also coded using an arithmetic coder.

TABLE 2 shows an exemplary algorithm for text block coding, according to one embodiment.

TABLE 2

EXEMPLARY TEXT BLOCK CODING

Quantize the block using Color Quantization;
Convert the block pixels to index;
FOR row = 1 to last row
    FOR column = 1 to last column
        Get index for current pixel;
        /*generate Context for current pixel*/
        context := NW*25+N*5+W;
        Code current pixel index using the context;
        IF pixel index is 4 (other colors) THEN
            code the current pixel value;
        ENDIF
    ENDFOR
ENDFOR

Exemplary Hybrid Block Coding

Hybrid blocks 120 contain mixed text and pictures. There are strong high frequency signals due to text edges and DCT transform is only effective to compact the energy of low frequency signals, so the energy in DCT domain of hybrid block is very diverse and hard to code. If hybrid blocks are compressed with DCT block transform based coding such as JPEG, the resulting compressed image will suffer from ringing effects around the text due to large quantization step for those high frequency components. Wavelet-based schemes such as JPEG-2 fail to compress hybrid blocks effectively. While hybrid blocks are compressed with document image algorithms, the coding performance is too low to be acceptable. One solution to this problem is layered coding, wherein BFIC model 112 separates text and pictures in each block 120 into different layers and independently codes each respective layer.

In this implementation, BFIC model 112 implements a Haar wavelet based coding algorithm for hybrid blocks 120, although other encoding algorithms could also be used. Short wavelet bases are helpful to reduce the ringing effect around text (edge), and longer bases are good to improve the coding performance of the picture images. As a tradeoff between two requirements, Haar wavelet is utilized to code hybrid blocks. Use of Haar wavelets can effectively remove any "ringing effect" on resulting compressed image(s) 116 that comprise text. Its coding performance outperforms other coding algorithms both in peak-signal-to-noise-ratio (PSNR) and visual quality.

Encoder 112 first transforms a hybrid block 120 using Haar wavelets. In this implementation, only one level Haar wavelet transform is utilized for this transformation because multi-level Haar wavelet transforms will generally produce long wavelet bases not suitable for hybrid blocks 120. The wavelet coefficients are then coded by a simple arithmetic coder. The coefficients of different sub-bands are coded using different contexts. The simple Haar wavelet algorithm can significantly improve the visual quality and PSNR of compressed images 116 resulting from hybrid blocks 120.

Exemplary Picture Block Coding

JPEG has been proved to be an effective low complexity algorithm to compress picture images. Encoder 112 implements a JPEG-like algorithm to compress picture blocks 120. However, in contrast to conventional JPEG algorithms, encoder 112 skips blocks 120 of other types in this block-based scheme.

Exemplary Quality-Based Rate Allocation

Mode Selection

Encoder 112 determines the proper coding algorithm (mode selection) for each block 120 under a specified rate constraint. In this implementation, this is accomplished by using a quality-biased rate distortion optimization (QRDO) technique to substantially guarantee the quality of text in a compressed image 116 resulting from a compound image 114. The problem of optimal rate allocation is formulated as follows:

$$\min\left(\sum_i \alpha_i D_{i,x(i)}\right), \text{ subject to } \sum_i R_{i,x(i)} \le R_0 \quad (1)$$

$$x(i) \in \{\text{smooth, text, picture, hybrid}\}$$

where i indicates the i-th block 120 and $\alpha_i$ is a quality-weight factor, x(i) is the selected coding mode. Here $\alpha_i$ is evaluated as:

$$\alpha_i = \begin{cases} C_{hg}/T_{hg} & \text{for text/hybrid block} \\ 1.0 & \text{for smooth/picture block} \end{cases} \quad (2)$$

where $C_{hg}$ represents the high-gradient count of this block 120 and $T_{hg}$ is a threshold. Note that this factor is determined during the block classification process discussed above. This factor remains the same for each block 120 independent of block type. In this implementation, $T_{hg}$ is set as 0.1 to ensure that for most text blocks 120 the factor $\alpha_i$ is larger than 1.0.

Using Lagrangian optimization, for each block we have to minimize the cost function (cost is the sum of weighting distortions and used bits):

$$J_i = \alpha_i D_{i,x(i)} + \lambda R_{i,x(i)} \quad (3)$$

to choose the best mode x*(i). In general, if more bits are used in coding a image, the reconstructed quality is better. To reduce distortion, bits can be increased, but this does not represent the optimal solution. The optimal target is to minimize the combination of distortions and bits. One issue is how to determine the value of λ to satisfy the given rate constraint.

Rate-Distortion (R-D) optimized mode selection can achieve the optimal coding performance subject to a specified rate constraint. To this end, encoder 112 sets the parameter λ in (3). Because evaluation of λ can be very computation-intensive in view of a given a rate constraint $R_0$, encoder 112 implements an approximated algorithm to determine the Lagrangian parameter λ. In this approximation algorithm, quality parameters for picture coder and hybrid coder operations (discussed above) are evaluated in view of the rate constraint. Encoder 112 utilizes the slopes of the R-D curves of the two flexible coders to estimate λ and make the mode selection. It is possible that the total rate at this point may not satisfy the rate constraint. In this scenario, encoder 112 changes the quality parameters and estimates a new λ, and again select mode for each block. These operations are iterated until the rate constraint is satisfied and minimum distortion is maintained without change for a certain period.

Modeling and Quality Parameters Setting

Modeling can help greatly in computations for rate-distortion tradeoff and it has been well studied in rate-control works for video coding. Exponential approximation is proper for both rate and distortion, that is $$D(Q) \approx AQ^\alpha, R(Q) \approx BQ^\beta \quad (4)$$

where Q is the quantization step, and A, B, α>0, β<0 are parameters that depend on the characteristics of the block 120. According to the QRDO technique, distortion is replaced with weighted distortion, i.e.

$$D_i' = \alpha_i D_i, \quad (5)$$

wherein $\alpha_i$ is the quality-weight factor defined in (2). Then we use minimize-MSE fitting for both hybrid coder and cont-tone (picture) coder to solve the parameters in (4). So, derived from constant slope policy, the following is determined:

$$\lambda = -\frac{A_h}{B_h}\frac{\alpha_h}{\beta_h}Q_h^{\alpha_h - \beta_h} = -\frac{A_c}{B_c}\frac{\alpha_c}{\beta_c}Q_c^{\alpha_c - \beta_c} \quad (6)$$

which can calculate the Lagrangian parameter λ for mode selection. Here the subscript h and c indicate hybrid and picture blocks. Additionally, $$N_h R_h + N_c R_c \le R_0' \quad (7)$$

where $N_h$ and $N_c$ represent the numbers of hybrid and picture blocks, $R_h$ and $R_c$ correspond to average rates of hybrid and picture blocks, and $R_0'$ means the rate constraint of hybrid and picture blocks 120, it equals the difference of $R_0$ and the rate consumed by smooth and text blocks 120. We assume that the total-rate constraint is high enough so that $R_0'$ is reasonable. So now, by combining (4), (6) and (7), $Q_h$ and $Q_c$ can be easily solved, and by (6) an estimated value of the Lagrangian parameter λ for mode selection is also determined.

Figure 5:
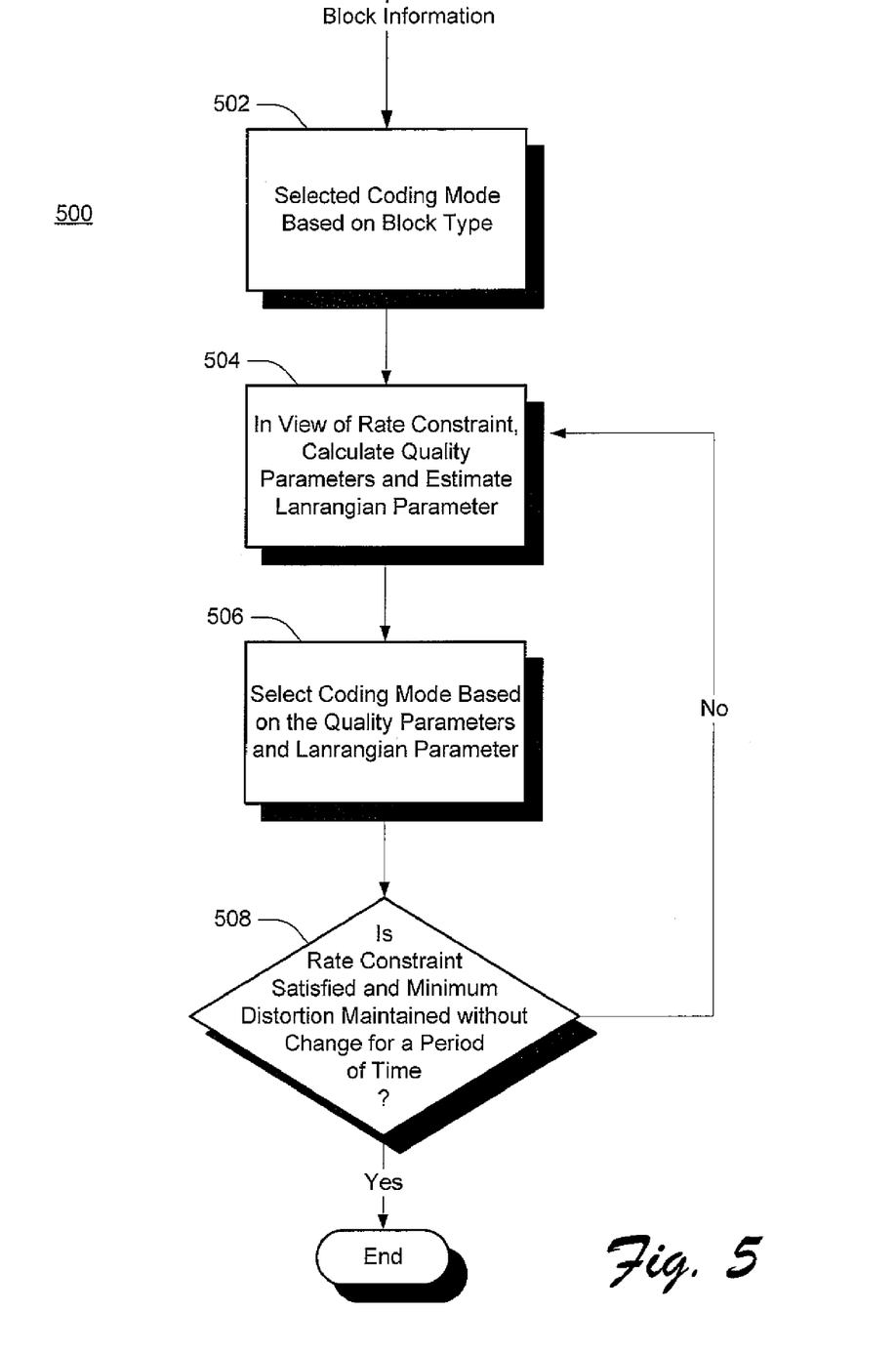
FIG. 5 shows exemplary procedure for selecting an appropriate coding algorithm for each block segmented from a digital image, according to one embodiment.

FIG. 5 shows exemplary procedure 500 for selecting an appropriate coding algorithm for each block segmented from a digital image, according to one embodiment. For purposes of the exemplary description, the operations of the procedure are described with respect to the components of FIG. 1. At block 502, encoder 112, in view of block information, selects a coding mode based on block type. The block information includes for example, information associated with a block 120. This information includes block 120 block type. At block 504, encoder 112, in view of a rate constraint, calculates quality parameters and estimates a Langrangian parameter. At block 506, encoder 112 selects the coding mode based on to the calculated and estimated parameters. At block 508, encoder 112 determines whether the rate constraint is satisfied and minimum distortion is maintained without change for a period of time. If not, the operations continue at block 504, as discussed above, until the conditions are achieved.

An Exemplary Procedure

Figure 6:
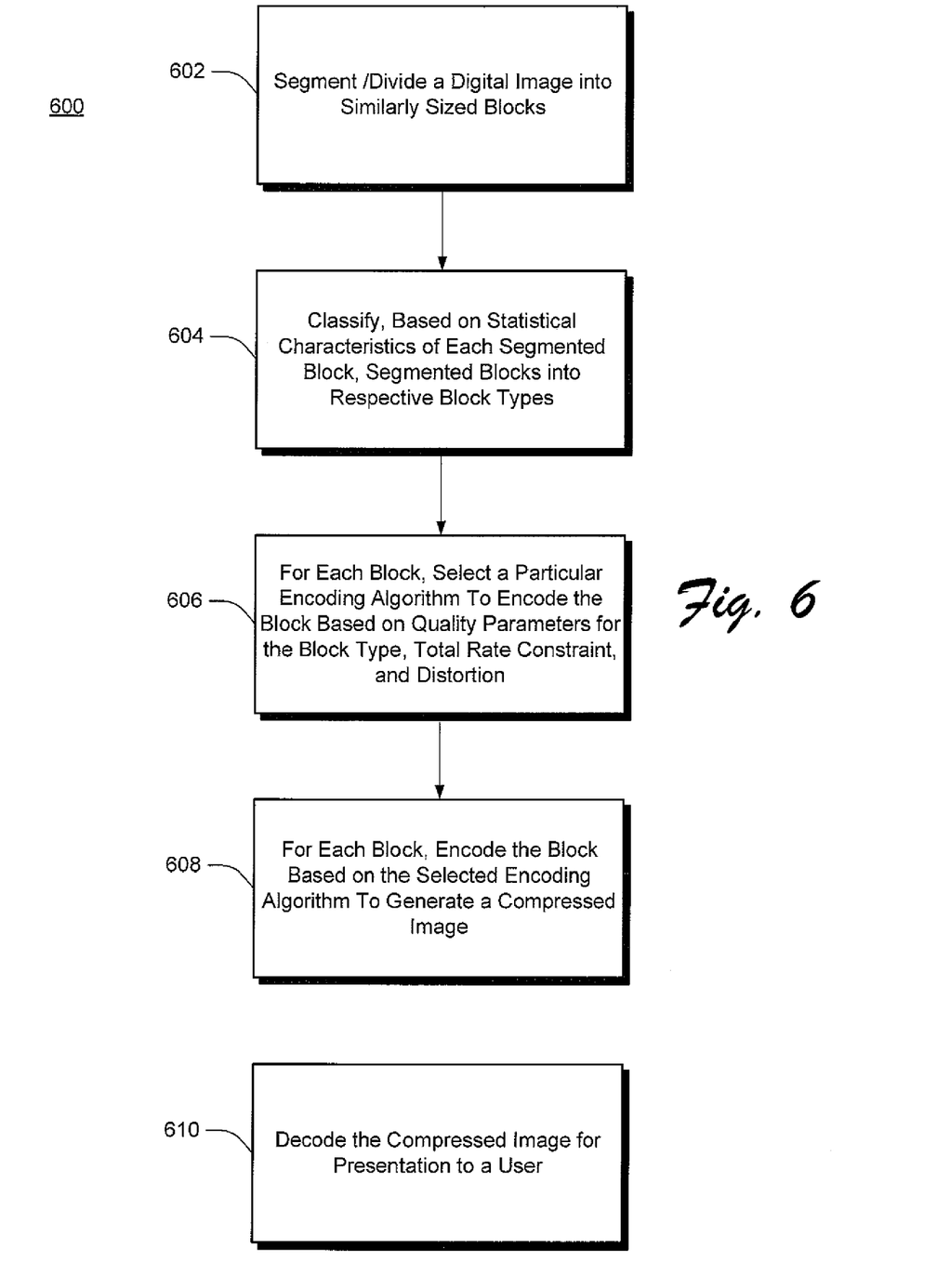
FIG. 6 shows an exemplary procedure for block-based fast image compression, according to one embodiment.

FIG. 6 shows an exemplary procedure 600 for block-based fast image compression, according to one embodiment. For purposes of exemplary illustration and description, the operations of the procedure are described with respect to components of FIG. 1. At block 602, encoder 112 segments a digital image 114 into similarly sized blocks 120. At block 604, encoder 112 classifies, based on statistical characteristics of each segmented block 120, each block 120 as a respective block type. At block 606, encoder 112 selects a particular encoding algorithm to encode the block 120 based on quality parameters associated with the block type, a total rate constraint, and acceptable distortion. At block 608, encoder 112 encodes each block 120 of the digital image 114 based on the corresponding selected encoding algorithm to generate a compressed image 116. At block 610, the compressed image 116 is decoded by a decoder 118 in view of information encapsulated by the compressed image 116 for presentation (e.g., via a display 128 of FIG. 1) to a user. Such information includes, for example, an indication of the particular encoding algorithm used to encode each block 120, a color index, etc.

CONCLUSION

Although the systems and methods for block-based fast image compression have been described in language specific to structural features and/or methodological operations or actions, it is understood that the implementations defined in the appended claims are not necessarily limited to the specific features or actions described. For example, although system 100 of FIG. 1 has been described with respect to encoding compound images, system 100 can also be used to encode non-compound images. In such a scenario, a non-compound image may have only blocks 120 classified as text, or some combination of picture and/or smooth, and no hybrid content. In view of this, the specific features and operations of system 100 are disclosed as exemplary forms of implementing the claimed subject matter.

The invention claimed is:

1. A computer-implemented method comprising:
   segmenting, by a computing system configured to provide block-based fast image compression, a digital image into multiple blocks;
   for each block of the multiple blocks, identifying, by the computing system, a respective set of statistical characteristics of the block; and
   encoding, by the computing system, each block of the multiple blocks with a particular encoding algorithm of multiple encoding algorithms, the particular encoding algorithm being selected in view of a quality-weight factor that is evaluated in view of a total rate constraint and weighted distortion, the quality-weight factor being determined from statistical characteristics that indicate block type, the total rate constraint being a function of total numbers of hybrid and picture blocks in the digital image.

2. The method of claim 1, wherein block size of respective ones of the multiple blocks is arbitrary and variable.

3. The method of claim 1, wherein the statistical characteristics indicate that the block is a smooth block, and wherein the encoding further comprises quantizing, by the computing system, all colors in the smooth block to a most frequent color.

4. The method of claim 1, wherein the statistical characteristics indicate that the block is a text block, and wherein the encoding further comprises:
   quantizing, by the computing system, colors within a given distance threshold to major colors to corresponding major colors;
   converting, by the computing system, pixels in the text block to index values; and
   for each pixel of the pixels:
   generating, by the computing system, a context for the pixel based on pixel neighbors; and
   coding, by the computing system, the pixel using the context.

5. The method of claim 1, wherein the statistical characteristics indicate that the block is a hybrid block, and wherein the encoding further comprises:
   separating, by the computing system, text and pictures in the block into different layers; and
   independently coding, by the computing system, each layer of the layers.

6. The method of claim 1, wherein identifying the respective set of statistical characteristics for the block further comprises:
   calculating, by the computing system, gradients for at least a subset of pixels comprising the block;
   generating, by the computing system, a gradient histogram from the gradients; and
   classifying, by the computing system, the block as a smooth block, text block, picture block, or hybrid block based on gradient distributions associated with the gradient histogram.

7. The method of claim 6, wherein a gradient of the gradients represents an absolute difference between a pixel and a neighboring pixel.

8. The method of claim 6, wherein generating the gradient histogram further comprises:
   thresholding, by the computing system, the gradients to identify distributions of the gradients; and
   creating, by the computing system, the gradient histogram in view of pixel counts associated with the distributions.

9. The method of claim 8, wherein thresholding classifies the gradients into one or more of a low-gradient class, a mid-gradient class, and a high-gradient class.

10. A computer-readable storage medium comprising computer-program instructions that when executed by a processor perform operations comprising:
    accessing a compressed image, the compressed image being comprised of multiple encoded block segments, each block of the multiple encoded block segments being encoded with a particular encoding algorithm of multiple encoding algorithms, the particular encoding algorithm used to encode the block being based at least on statistical characteristics associated with original digital image content of the block, the statistical characteristics indicating that the block is one of a smooth block, a text block, a picture block, and a hybrid block, in an even that the statistical characteristics indicating that the block is the text block,
    quantizing colors in the block within a given distance threshold to major colors to corresponding major colors; and
    converting pixels in the block to index values; and
    decoding the compressed image, the decoding comprising:
    in the event that the statistical characteristics indicate that the block is the text block,
    for each pixel of the pixels, decoding the pixel in view of a corresponding value of the index values and a context generated from pixels neighboring the pixel.

11. The computer-readable storage medium of claim 10, wherein the statistical characteristics for the block are based on distributions of gradients calculated for at least a subset of pixels comprising the block.

12. The computer-readable storage medium of claim 10, wherein the statistical characteristics for the block are based on distributions of gradients calculated for at least a subset of pixels comprising the block, each gradient of the gradients representing an absolute difference between a pixel and a neighboring pixel.

13. The computer-readable storage medium of claim 10, wherein the statistical characteristics for the block are based on distributions of gradients calculated for at least a subset of pixels comprising the block, the distributions being based on respective ones of the gradients being classified into one or more of a low-gradient class, a mid-gradient class, and a high-gradient class.

14. The computer-readable storage medium of claim 10, wherein the statistical characteristics indicate that the block is a smooth block, and wherein all colors encoded in the smooth block are quantized to a most frequent color.

15. The computer-readable storage medium of claim 10, wherein the statistical characteristics indicate that the block is a hybrid block, and wherein different layers respectively represent text and pictures in the block; and wherein the computer-program instructions for decoding further comprise instructions for independently decoding each layer of the layers.

16. A computing device comprising:
    a processor; and
    a memory couple to the processor, memory comprising computer-program instructions executable by the processor for:
    segmenting a digital image into multiple blocks;
    for each block of the multiple blocks, identifying a respective set of statistical characteristics of the block;
    encoding each block of the multiple blocks with a particular encoding algorithm of multiple encoding algorithms, the particular encoding algorithm being selected in view of a quality-weight factor that are evaluated in view of a total rate constraint and weighted distortion, the quality-weight factor being determined from statistical characteristics that indicate block type, the total rate constraint being a function of total numbers of hybrid and picture blocks in the digital image.

17. The computing device of claim 16, wherein the computer-program instructions for identifying the respective set of statistical characteristics for the block further comprise instructions for:
    calculating gradients for least a subset of pixels comprising the block;
    generating a gradient histogram from the gradients; and
    classifying the block as a smooth block, text block, picture block, or hybrid block based on gradient distributions associated with the gradient histogram.

18. The computing device of claim 16, wherein the statistical characteristics indicate that the block is a smooth block.

19. The computing device of claim 16, wherein the computer device further comprises instructions for quantizing all colors in the smooth block to a most frequent color.

20. The computing device of claim 16, wherein the statistical characteristics indicate that the block is a text block, and wherein the encoding further comprises:
    quantizing colors within a given distance threshold to major colors to corresponding major colors;
    converting pixels in the text block to index values; and
    for each pixel of the pixels:
    generating a context for the pixel based on pixel neighbors; and
    coding the pixel using the context.

\* \* \* \* \*